United States Patent [19]

Shaner

[11] Patent Number: 4,840,228
[45] Date of Patent: Jun. 20, 1989

[54] HEAT EXCHANGER HAVING METAL WIRE SCREENS, AND METHOD OF MAKING STACK OF SCREENS THEREFOR

[76] Inventor: Richard L. Shaner, 10186 Pine Ledge Dr. South, Clarence, N.Y. 14031

[21] Appl. No.: 764,777

[22] Filed: Aug. 12, 1985

[51] Int. Cl.⁴ ............................................... F28D 7/02
[52] U.S. Cl. .................................................. 165/165
[58] Field of Search ..................... 165/154, 164, 165

[56] References Cited

U.S. PATENT DOCUMENTS

| | | | |
|---|---|---|---|
| 1,016,741 | 2/1912 | Fritz | 165/154 |
| 1,734,274 | 11/1929 | Schubart | 165/165 X |
| 3,409,075 | 11/1968 | Long | 165/164 X |
| 3,491,184 | 1/1970 | Rietdijk | 165/165 X |

OTHER PUBLICATIONS

Slone, N. J. and Steyert, W. A., "An Ultra-Compact Low-Cost Heat Exchanger", Cryogenics, Nov. 1978, p. 627.
"Compact High Efficiency Perforated-Plate Heat Exchanger", Anashkin, Kerlin & Patrikiev, Cryogenics, Jul. 1976, vol. 16, No. 7, pp. 437–439.

*Primary Examiner*—Ira S. Lazarus
*Assistant Examiner*—Peggy Neils
*Attorney, Agent, or Firm*—Sommer & Sommer

[57] ABSTRACT

A heat exchanger comprising a stack of metal cloth or wire screens partitioned by sealant material into different regions through which separate fluids flow to exchange heat by way of conduction through the metal wires.

2 Claims, 2 Drawing Sheets

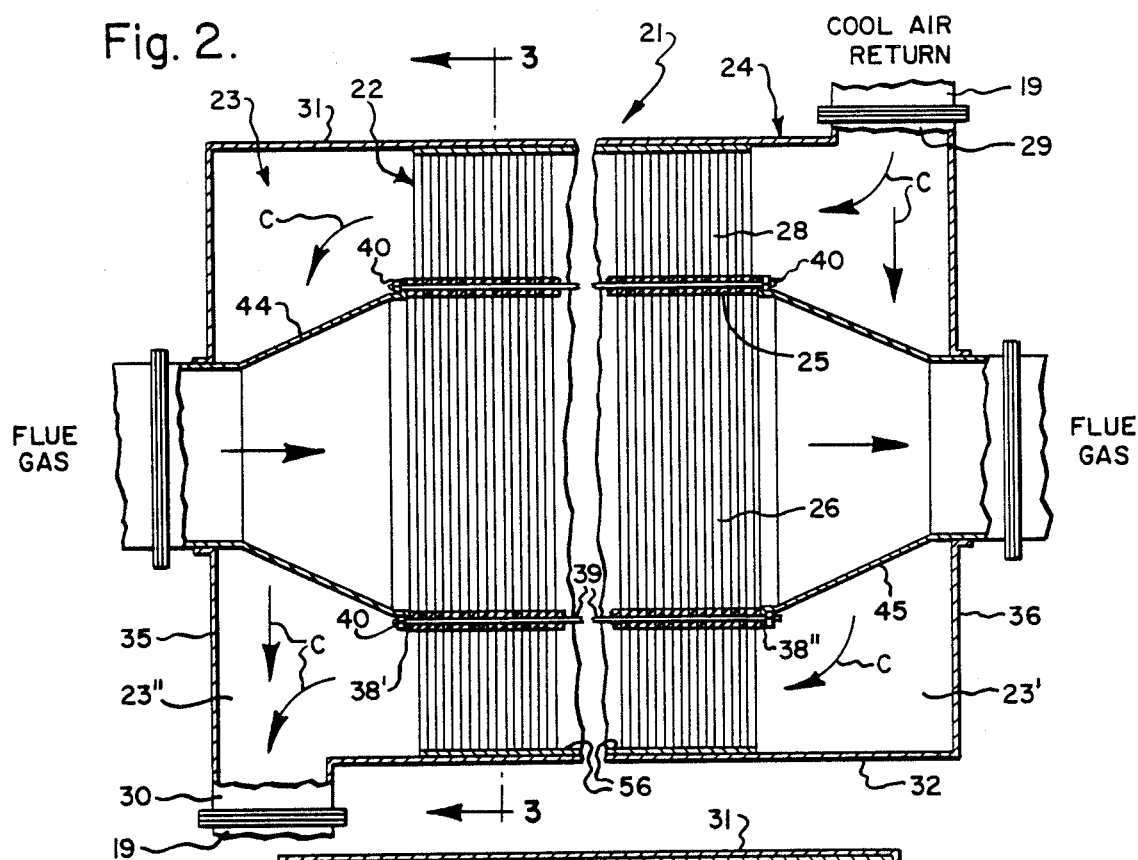
Fig. 2.
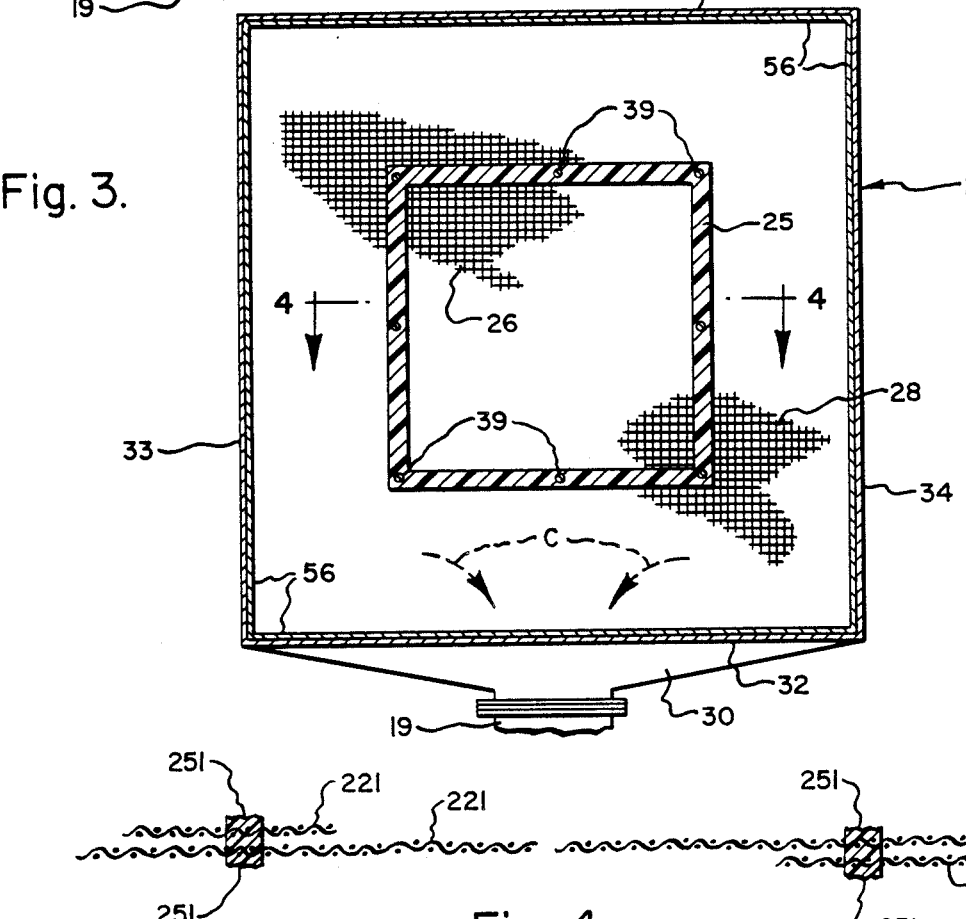
Fig. 3.
Fig. 4.

HEAT EXCHANGER HAVING METAL WIRE SCREENS, AND METHOD OF MAKING STACK OF SCREENS THEREFOR

FIELD OF THE INVENTION

This invention relates to the field of heat exchangers, and more particularly to one which exchanges heat between fluids by way of conduction through the metal wires of a stack of metal screens partitioned so that the fluids flow through different regions of the stack.

BACKGROUND OF THE INVENTION

It is well known to provide heat exchangers in which an impervious metal wall separates the fluids and conducts heat therebetween. It is also known to provide outward projections on one or both sides of such a metal wall to increase the area contacted by the fluid. For example, U.S. Pat. No. 166,461 discloses spaced concentric metal pipes in which metal projections are provided on the inner and outer sides of the inner pipe. In U.S. Pat. No. 2,112,743 metal screening is arranged on one or both sides of a metal wall separating fluids.

A construction of heat exchanger is also known from U.S. Pat. No. 2,825,210 which discloses a plurality of metal sheets spaced apart by interposing blocks of rubber between adjacent sheets to divide their areas into side-by-side flow paths for different fluids, these flow paths being parallel to the flat surfaces of the metal sheets.

SUMMARY OF THE INVENTION

The primary object of the present invention is to provide a novel low-cost heat exchanger which exchanges heat between two or more fluid streams in an economical manner. Other objects are to provide such a heat exchanger which is compact, efficient, uncomplicated and relatively inexpensive to manufacture, simple and flexible in design, enabling tailoring for a specific application with regard to the amount of heat to be transferred, pressure drops in each fluid stream, heat transfer coefficients, and material of construction having regard to conduction and possible corrosion.

These objects are achieved by providing a heat exchanger comprising a plurality of metal wire cloths or screens, preferably flat and having the same overall dimensions, laid one on top of another to provide a stack of screens. The stream channels or paths for the fluids are defined by a narrow band of sealant used between adjacent screens. The sealant fills the interstices or void spaces between the wires in each wire cloth or screen, as well as between adjacent screens. In the fabrication of the heat exchanger, the sealant is applied to each screen successively after each screen has been properly placed on another screen so as to build up the stack. When the desired number of screens has been stacked with the sealant applied to each successively, the stack is suitably clamped to provide a unitized structure in which the bands of sealant are compressed into an impervious barrier partitioning the stack into different regions. This unitized structure is then associated with suitable duct means for supplying the separate fluids to the ends of the different isolated regions of the stack, whereby the fluids will flow in a direction generally perpendicular to the planes of the screens, through the interstices or void spaces thereof, and cause heat to be exchanged between the fluids by way of conduction through the metal wires of the screens which extend across the sealant barrier.

BRIEF DESCRIPTION OF THE DRAWINGS

FIG. 2 is an enlarged vertical sectional view of the inventive heat exchanger shown in FIG. 1.

FIG. 3 is a vertical transverse sectional view of the inventive heat exchanger, taken on line 3—3 of FIG. 2.

FIG. 4 is an enlarged fragmentary view of two adjacent screens in the stack of screens shown in FIGS. 1 and 2, this view being taken generally on lines 4—4 of FIG. 3.

DESCRIPTION OF PREFERRED EMBODIMENT

Figure 1:
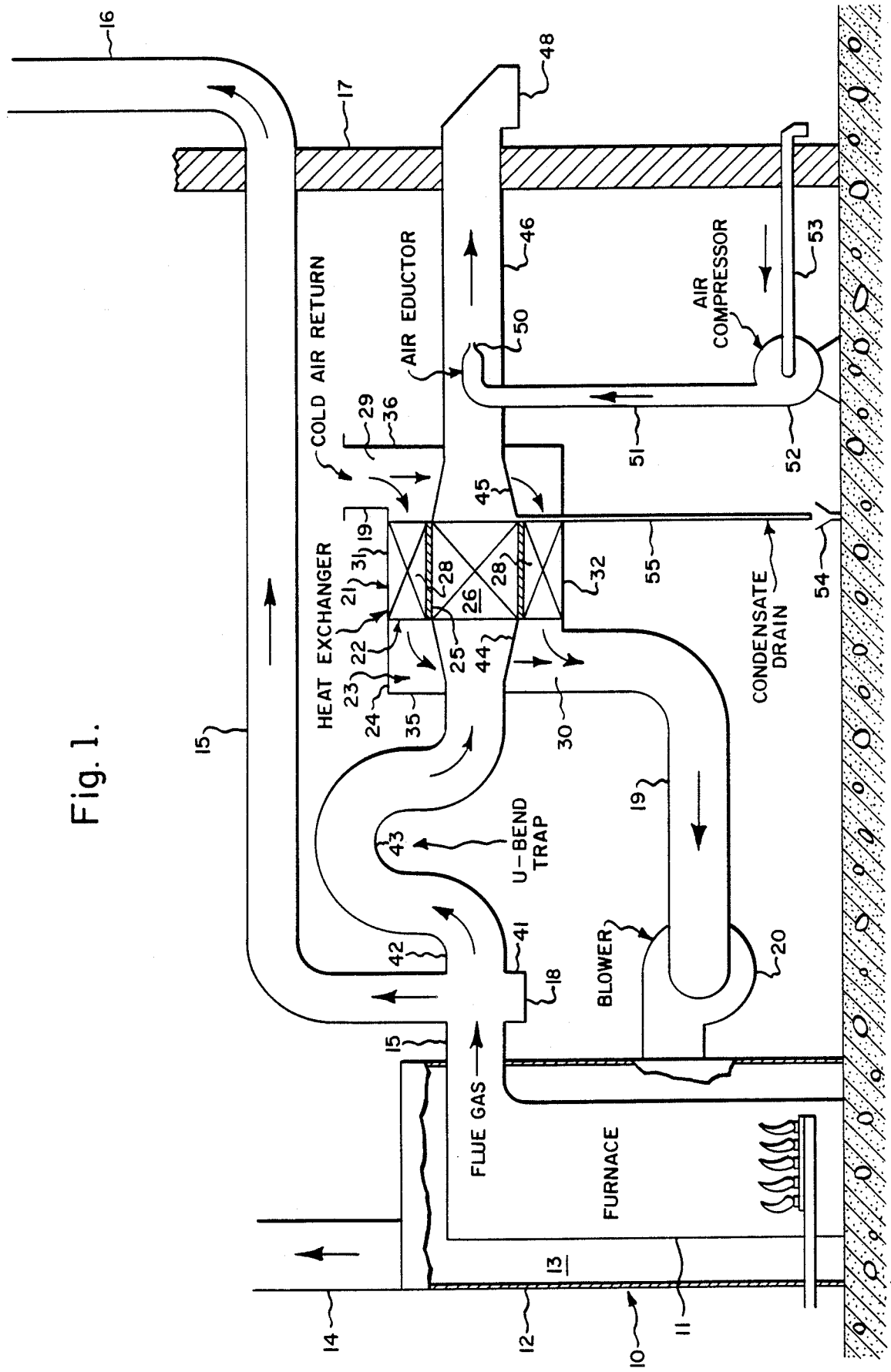
FIG. 1 schematically depicts a residential hot air heating system incorporating the inventive heat exchanger for exchanging heat between the flue gas from a natural gas fired furnace and the cold air return to the furnace.

While the inventive heat exchanger may be utilized where suitable, the same has been illustrated as installed for heat recovery in a residential heating system. In such application, the inventive heat exchanger handles two low pressure streams, essentially at atmospheric pressure.

Referring to FIG. 1, the residential heating system is shown as including a natural gas fired hot air furnace 10 having a fire box 11, surrounded by a spaced shell 12 to provide a hot air chamber 13 having an outlet duct 14 leading to rooms (not shown) to be heated. The hot flue gas exhausts from fire box 11 through a flue pipe 15 shown connected to a chimney 16 on the outside of an exterior wall 17 of the residence. Flue pipe 15 has the usual down draft opening 18. A cold air return duct 19 leads from one or more rooms of the residence and communicates with furnace chamber 13 near the lower end thereof. The blower 20 is shown as arranged in return duct 19 to cause air to flow through the rooms of the residence via ducts 14 and 19, as is well known.

The inventive heat exchanger, represented generally by the numeral 21, is shown in FIG. 1 as being operatively interposed between the flue pipe 15 and cold air return pipe 19, in order to utilize hot flue gas to preheat air returning to the furnace. As will be explained more in detail later in connection with FIGS. 2-4, heat exchanger 21 comprises a stack 22 of metal wire cloth or screens, standing on their edges, and transversely filling the intermediate part of a chamber 23 of a somewhat horizontally elongated shell or housing 24. Stack 22 is partitioned, as indicated at 25, to provide an inner region 26 surrounded by an outer region 28. Shell 24 has an upper inlet 29 adjacent its right end, communicating with an upstream portion of cold air return duct 19, and also has a lower outlet 30 adjacent its left end, communicating with a downstream portion of duct 19.

As best shown in FIGS. 2 and 3, shell 24 is suitably fabricated from sheet metal and includes vertically spaced flat horizontal top and bottom walls 31 and 32, respectively, left and right vertical side walls 33 and 34, respectively, and left and right vertical end walls 35 and 36, respectively. These end walls are spaced from the corresponding ends of stack 22, leaving unoccupied end portions 23' and 23" of chamber 23 which communicate respectively with inlet 29 and outlet 30. In this manner, cold air can flow from inlet 29 to outlet 30, through the outer region 28 of stack 22, such flow being represented by arrows c.

The plurality of screens making up stack 22 are shown as held together as a unit by angle iron bars 38 arranged over partition 25 at opposite ends of the stack. These angle iron bars are connected by tie rods 39 passing through holes in the bars, having threaded ends on which nuts 40 are screwed to bear against the bars. By tightening these nuts, the screens can be clamped together. The tie rods 39 penetrate the various screens and also the partition 25.

In order to conduct hot flue gas through the inner region 26 of stack 22, when the heat exchanger 21 is functioning, a tee 41 is provided in the flue pipe 15 immediately downstream of furnace 10. This tee is shown as connected to an upstream pipe 42 having a vertical inverted U-bend or trap, indicated at 43, and leads to an inlet duct 44. This duct suitably sealingly penetrates left end wall 35 and is suitably connected to the angle iron frame 38' at the left end of inner region 26 of stack 22 and communicates with this region. The right end of this region 26 of the stack communicates with an outlet duct 45 which is suitably connected to the angle iron frame 38", at the right end of the stack. Duct 45 suitably sealingly penetrates right end wall 36 and communicates with a downstream pipe 46 which leads to the outside of building wall 19 and terminates in a downturned outlet 48.

The vertical inverted U-band 43 serves as a trap to prevent the flow of flue gas through the heat exchanger 21, in the event that any part of the heat exchanger becomes non-functional. In such case, the flue gas will proceed unimpeded through pipe 15 and up the chimney 16, as in the normal manner.

Assuming the heat exchanger 21 is functional, the flow of hot flue gas continues from the U-bend 43 through the heat exchanger where the temperature of the flue gas is reduced and the heat transferred to the cold air returning to the furnace prior to being reheated in the furnace. The cold air returning to the furnace is preheated prior to being heated to the required temperature by the gas-fired furnace, thus recovering the previously wasted heat in the flue gas. Heat is transferred between the hot flue gas through inner region 26 to the cold air counterflowing through outer region 28 by way of thermal conduction through the wires of the screens.

Eductor means are provided to cause flue gas to pass through region 26 of the heat exchanger 21. While such eductor means may be variously constructed, the same is shown as comprising a nozzle 50 arranged centrally in pipe 46 and pointing downstream so as to discharge to the right. This nozzle is supplied with compressed air through a pipe 51 connected to the outlet of a small blower or air compressor 52, the inlet of which draws air through an inlet pipe 53 shown as leading from the outside of the building wall 17. Thus, a partial vacuum is generated in pipe 46 upstream of eductor nozzle 50 and a positive pressure downstream of this nozzle. In this manner, flue gas is under a partial vacuum through the furnace and heat exchanger, being caused to flow through communicating passages 42-46. Thus, no flue gas can escape into the air side of the heat-recovery system. The air eductor raises the pressure of the cooled flue gas which is conducted by pipe 46 and discharged to the atmosphere through outlet 48. Suction for the air compressor 52 is from outside of the residence. Any leaks that might possibly develop would draw air from the cold air return or air adjacent the various ducts or pipes into the flue gas stream, rather than vice versa.

Referring to FIG. 1, any condensation of moisture occurring on the flue gas side of the partition 25 can be conducted to a drain 54 via a tubing 55, shown communicating with inner region 26 proximate the downstream or right end thereof.

Referring to FIGS. 3 and 4, the fluid stream channels or paths are defined by a narrow band of sealant 251 suitably applied to each screen 221 as the stack of the same is built up. The sealant band is preferably continuous or endless, to provide collectively an enclosed barrier partitioning the stack of screens into the regions 26 and 28. Any sealant pattern other than the square one shown, may be provided, as desired.

The sealant may be a paste applied by a suitable tool (not shown) through the opening in a mask (not shown) placed on the screen. If a mask is used, it is removed after a layer of sealant is applied to one screen, and then another screen is laid on top. Some of the sealant may squeeze up into the higher screen, filling some or all of the void spaces therein, within the width or limits of the band. The mask is placed over this higher screen in the proper location, and another sealant band is formed. In this manner, the barrier or partition of sealant is built up for the number of screens or plies of wire cloth employed. Any other suitable manner of applying sealant to the screens may be used.

Any suitable sealant may be employed, depending upon the intended use for the heat exchanger, particularly the temperature encountered. Examples of sealants which may be used in the preferred embodiment illustrated and described, include "HI-HEAT" Furnace/Stove Cement' as manufactured by Hercules Chemical Co., and "Furnace Cement" as manufactured by Rutland Co., or equivalent sealing material. Preferably, a sealant is used which, while being in a paste form when applied, will set or firm up, yet remain slightly pliable, to provide a lasting seal.

Referring to FIG. 3, it will be seen that the screens have the same size and shape as the cross-sectional shape of the shell or housing. In order to prevent fluid bypassing the screens at the extremities of their edges, it is preferred to provide a gasket 56 in the form of a thin layer of material such as fiberglass wrapped around the stack of screens.

The wire cloths or screens 221 may be woven from any suitable metal wire which has reasonably high thermal conductivity. Typical examples of metal wire include aluminum wire, designated as 5056 Aluminum Alloy, and also commercially pure copper wire. A suitable diameter of such metal wire is woven into a cloth or screen having the desired mesh size. Typical examples of mesh size, representing the number of openings per lineal inch of screen, and also of wire diameter, are:

10 mesh×0.025 inch wire diameter; and 18 mesh×0.010 inch wire diameter.

Mesh size and wire diameter are economic parameters in a heat exchanger designed in accordance with the present invention for a particular application, and therefore a variety of combinations are functionally and economically feasible. The above examples are only two of a number of combinations, and are not the only combinations that could be used.

In the preferred embodiment illustrated, the wire screens 221 are shown as similar, one to another, in overall dimensions or outline, and in mesh size, wire diameter and composition of metal for the wire. While, in some applications of th e inventive heat exchanger, it may be desirable to employ such similar screens throughout the length or height of the stack of the same, the invention also contemplates a stack comprised of two or more contiguous zones or groups of different screens. One group might be composed of a plurality of screens having certain characteristics, as to mesh size, wire diameter and metal, different from those in a plurality of screens composing another group. For example, there may be screens in a dry zone impinged first by a hot gas in which the sensible heat is removed, and a contiguous downstream wet zone in the same stack in which condensation would be helped by screens having a larger wire diameter and a smaller mesh size, thus providing larger openings for droplets to form and coalesce without clogging the screens and impeding gas flow. Accordingly, different mesh sizes, wire diameters and metal wire, can be selected to provide the most effective design of heat exchanger for the application in mind.

Also, a stack of screens may be partitioned into more than the two regions 26 and 28 shown, by providing more than one partition, and thereby enabling more than two fluids severally engaging different portions of the screens to flow in heat exchange relationship with respect to one another.

While the major use of the inventive heat exchanger is preferred for heat recovery in a residential heating system, as illustrated and descried herein, the invention is not limited to such use.

Other variations and modifications in the illustrated heat exchanger may occur to those skilled in the art without departing from the spirit of the invention, the scope of which is to be measured by the appended claims.

What is claimed is:

1. A heat exchanger comprising:

means providing a chamber, a stack of metal wire screens transversely filling said chamber, sealant means arranged between adjacent screens in the same endless pattern and located inwardly of the edges of said screens to provide a barrier enclosing an inner region of said stack surrounded by an outer region of said stack, means clamping said stack of screens to compress said barrier, including bars arranged over said barrier at opposite ends of said stack, tie rods passing through holes in the bars at least at one end of said stack, penetrating the various screens and also said barrier, and at such one end of said stack having threaded ends on which nuts are screwed to bear against such bars, means for conducting the flow of a first fluid through said inner region from end to end, and means for conducting the flow of a second fluid through said outer region from end to end, a layer of gasket material wrapped around said stack to prevent fluid bypassing the screens at the extremities of their said edges, whereby heat is exchanged between said fluids by way of conduction through the metal wires of said screens.

2. A heat exchanger comprising:

a stack of metal wire screens, sealant means arranged as an endless band between adjacent screens in the same pattern to provide a barrier enclosing a region of said stack surrounded by another region, said sealant means filling the interstices of the screens within the width of such band and also filling any space between adjacent screens within said width, means clamping said stack of screens to compress said barrier, including bars arranged over said barrier at opposite ends of said stack and tensioned tie rods extending between said bars and penetrating the various screens and also said barrier, first means for supplying a first fluid through the interstices of the portions of screens in such enclosed region, and second means for supplying a second fluid through the interstices of the portions of screens in said another region of said stack, whereby heat is exchanged between said fluids by way of conduction through the metal wires of said screens.

* * * * *